(12) United States Patent
Long, II

(10) Patent No.: US 12,174,024 B2
(45) Date of Patent: Dec. 24, 2024

(54) ESTIMATING CAMERA MOTION THROUGH VISUAL TRACKING IN LOW CONTRAST HIGH MOTION SINGLE CAMERA SYSTEMS

(71) Applicant: Qwake Technologies, Inc., San Francisco, CA (US)

(72) Inventor: John Davis Long, II, New York, NY (US)

(73) Assignee: Qwake Technologies, Inc., San Francisco, CA (US)

( * ) Notice: Subject to any disclaimer, the term of this patent is extended or adjusted under 35 U.S.C. 154(b) by 387 days.

(21) Appl. No.: 17/685,590

(22) Filed: Mar. 3, 2022

(65) Prior Publication Data

US 2022/0282978 A1 Sep. 8, 2022

Related U.S. Application Data

(60) Provisional application No. 63/156,246, filed on Mar. 3, 2021.

(51) Int. Cl.
*G01C 21/34* (2006.01)
*A42B 3/04* (2006.01)
(Continued)

(52) U.S. Cl.
CPC .............. *G01C 21/34* (2013.01); *A42B 3/042* (2013.01); *G06F 3/14* (2013.01); *G06T 3/40* (2013.01);
(Continued)

(58) Field of Classification Search
CPC .. G01C 21/34; G06T 7/70; G06T 3/40; G06T 7/20; G06T 2207/10016;
(Continued)

(56) References Cited

U.S. PATENT DOCUMENTS

2014/0369557 A1* 12/2014 Kayombya ............... G06T 7/73
382/103
2016/0005229 A1* 1/2016 Lee .......................... G06T 11/60
345/419

FOREIGN PATENT DOCUMENTS

UA 146540 U * 2/2021 ............... G06V 9/00

OTHER PUBLICATIONS

Engel et al., "LSD-SLAM: Large-Scale Direct Monocular SLAM," Springer International Publishing, 2014, pp. 834-849.
(Continued)

*Primary Examiner* — David F Dunphy
(74) *Attorney, Agent, or Firm* — Marton Ribera Schumann & Chang LLP; Chien-Ju Alice Chuang

(57) ABSTRACT

Systems and methods are provided that track camera motion from image and sensor data in single-camera, low contrast and high-motion systems. Camera motion is estimated through dense visual tracking using image and sensor data. Motion sensor data from a wearable motion sensor worn by a human is used to determine initial camera motion parameters. Image data from a thermal imaging camera outputting low contrast video frames is used for motion tracking. The camera motion in the frame is represented by a translation and a rotation of the camera through an environment. The frames are down-sampled to generate image pyramid of frames of progressively lower resolution. A hierarchical homography optimizing approach is described. A homography is optimized across each resolution level beginning with the lowest resolution frames. A modified translation and rotation displacement of the camera is determined based on the optimized homography.

22 Claims, 3 Drawing Sheets

(51) Int. Cl.
*G06F 3/14* (2006.01)
*G06T 3/40* (2024.01)
*G06T 7/20* (2017.01)
*G06T 7/70* (2017.01)
*H04N 5/232* (2006.01)
*H04N 5/262* (2006.01)
*H04N 23/951* (2023.01)

(52) U.S. Cl.
CPC .............. *G06T 7/20* (2013.01); *G06T 7/70* (2017.01); *H04N 5/2628* (2013.01); *H04N 23/951* (2023.01); *G06T 2207/10016* (2013.01); *G06T 2207/10048* (2013.01); *G06T 2207/20016* (2013.01); *G06T 2207/30244* (2013.01)

(58) Field of Classification Search
CPC . G06T 2207/10048; G06T 2207/20016; G06T 2207/30244; H04N 23/951; H04N 5/2628; A42B 3/042; G06F 3/14
See application file for complete search history.

(56) References Cited

OTHER PUBLICATIONS

Jakob Engel, "Semi-Dense Visual Odometry for a Monocular Camera," IEEE, 2013, pp. 1449-1456.
Kerl et al., "Dense Visual SLAM for RGB-D Cameras," IEEE, 2013, pp. 2100-2106.
Newcombe et al., "DTAM: Dense Tracking and Mapping in Real-Time," IEEE, 2011, pp. 2320-2327.
Strasdat et al., "Scale Drift-Aware Large Scale Monocular SLAM," Robotics: Science and Systems VI, 2010, pp. 1-8.
Mei et al., "Efficient Homography-Based Tracking and 3-D Reconstruction for Single-Viewpoint Sensors," IEEE Transactions on Robotics, vol. 24, No. 6, 2008, pp. 1352-1364.

* cited by examiner

ESTIMATING CAMERA MOTION THROUGH VISUAL TRACKING IN LOW CONTRAST HIGH MOTION SINGLE CAMERA SYSTEMS

This application claims the benefit of U.S. Provisional Application No. 63/156,246, filed on Mar. 3, 2021, the disclosure of which is incorporated herein by reference in its entirety.

This disclosure generally relates to computer vision systems, and more specifically to a system and method for estimating camera motion through visual tracking using image and sensor data in low contrast and high-motion single camera systems.

In high stress and oftentimes hazardous work environments-including firefighting, search & rescue, oil and gas, fighter pilots, mining, special ops, and the like-workers regularly multi-task their immediate duties while also navigating complex terrain. For example, a firefighter attacking a structural fire must simultaneously search for the source of a fire, search for victims, collaborate with team members and monitor their gear, all while navigating. First Responders work in dangerous, highly dynamic environments. These environments are often very disorienting. When First Responders get disoriented at the scene of an emergency, precious time is lost, and, tragically, victims and First Responders can perish. Many times these workers are also operating in remote locations where external location tracking systems, e.g. GPS or Cellular towers, are either intermittent, provide insufficient resolution or have been destroyed by a disaster. The result is that personnel often get lost and would greatly benefit from wearable location tracking and route monitoring devices that do not depend upon external infrastructure.

Current GPS and Cellular tower triangulation methods work well together within urban environments, but they often perform poorly in remote locales or not at all at the scene of a disaster, particularly in indoor situations. In the case of GPS, the signals are more often intermittent and while useful for basic orientation, they provide a route estimate that is too course for back-tracking unstable or constrained routes when lost. Cellular tower triangulation is often used to augment GPS, but in remote areas or at the scene of a disaster, these towers are often unavailable or destroyed.

Image-based techniques for route tracking and visualization are better fitted for low or no external tracking and routing signal situations. Many image-based approaches currently exist. However, none of these existing approaches provide a robust solution for first-responder systems.

For example, single camera head-mounted systems are ideal for first responders due to their lower weight and high visibility mount location. For example, such systems are provided by Qwake Technologies, LLC and are described in U.S. Pat. No. 10,417,497, titled Cognitive Load Reducing Platform for First Responders, and U.S. Pat. No. 10,896,492, titled Cognitive Load Reducing Platform Having Image Edge Enhancement, both of which are incorporated herein by reference. These head mounted systems are subject to a large amount of camera motion due to the constant motion of the head. In addition, in single-camera or monocular camera systems, tracking and 3D reconstruction is very difficult because one must initialize an estimate of the camera motion in the absence of any 3D data. In contrast, calibrated stereo camera systems initialize against the 3D data provided by the two cameras. This is possible because when objects in the environment produce 2D data in each cameras' image, this and the known pose difference between cameras can be used to triangulate the 3D coordinates of the object. This initializes the 3D map for stereo camera rigs. Monocular systems must establish the difference in camera pose across time as well as the matching correspondences prior to initializing a 3D map. Some systems employ cumbersome initialization schemes which are typically not suited for first responder applications.

Further, in existing image-based approaches, the accuracy and precision of matching correspondences between image frames is a function of the structure of the environment as well as the quality and type of the camera used. Both of these factors have large implications for the class of computer vision algorithms typically employ to produce satisfactory results. For example, an algorithm that requires a lot of texture and contrast to match features in the images might work well in an art gallery filmed by a high-resolution visible light camera.

However, not only does high motion due to the head mounting impact the performance of these existing approaches but, as further explained in for example U.S. Pat. No. 10,896,492, the type of image data needed for first-responder systems presents an additional challenge. Specifically, for emergency situations, thermal imaging provides a better approach to capture relevant image data in low illumination conditions, such as a smoke-filled room. But, thermal images are typically low contrast and present a difficult problem for applications based on existing feature-based image tracking techniques. Thermal cameras do not image most textures in an environment, because these are often at the same temperature. Since first responders, in particular firefighters and energy sector workers, often use thermal cameras, special care must be taken when developing a matching correspondences algorithm for thermal cameras.

Accordingly, there is a need for improved methods and systems for high resolution tracking data, particularly for first responders operating in high-stress environments, that can perform adequately with low-contrast, high-motion, single camera systems.

BRIEF SUMMARY

According to various embodiments, a system and method for estimating camera motion through visual tracking using image and sensor data in low contrast and high-motion single camera systems is provided. According to one embodiment, a monocular thermal camera system intended for deployment in emergency zones is provided that estimates camera motion between frames using a calibrated monocular camera and an inertial measurement unit (IMU). In one embodiment, the IMU may be a 9 degree-of-freedom (DOF) system, which has a 3-axis gyroscope, a 3-axis linear accelerometer and a 3-axis magnetometer used to estimate camera motion. This camera motion and matching correspondences are then used to initialize and update the 3D structure in the environment.

According to embodiments, computer-implemented methods and systems are provided for estimating camera motion through visual tracking using image and sensor data. In embodiments, motion sensor data is received from a wearable motion sensor worn by a human. Image data is also received from a thermal imaging camera, the image data including a first low contrast video frame representing a translation and a rotation of the camera through an environment.

According to one aspect of embodiments, the motion sensor data is analyzed to determine an initial camera position and an initial homography for the first frame. The first frame is also down-sampled to generate a subset of frames of progressively lower resolution, the subset of frames including a lowest resolution frame. An optimized homography is determined by optimizing the initial homography based on a difference between the current frame and a prior frame from the thermal imaging camera using the subset of frames of progressively lower resolution beginning with the lowest resolution frame. Then, a modified translation and rotation displacement of the camera is determined based on the optimized homography.

According to some embodiments, remote signal data from a wireless power sensor can be received, the remote signal data associated with a remote wireless signal, and the modified translation and rotation displacement of the camera is combined with the remote signal data to determine a source location of the remote wireless signal.

According to some embodiments, the modified translation and rotation displacement of the camera is used to track a route through the environment. In some embodiments, the route is transmitted over a wireless network. In some embodiments, the route is displayed to the human, which in some embodiments may include providing navigation cues to the human.

According to some embodiments, an estimated camera motion is computed from the modified translation and rotation displacement of the camera. In some embodiments, a correspondence map of at least a portion of the environment is crated using the estimated camera motion.

According to another aspect of some embodiments, the human wearing the motion sensor is a first responder. Further, in some embodiments the sensor module, the camera module, the memory, and the processor are incorporated into a helmet, which, in some embodiments may be worn by the first responder. In some embodiments, the helmet can also include the wearable motion sensor and the thermal imaging camera.

Thus, according to embodiments, systems and methods for estimating camera motion through visual tracking using image and sensor data in low contrast and high-motion single camera systems are provided. These system may comprise one or more processors and non-transitory computer readable media. The non-transitory computer readable media includes instructions that when executed by the processor configures the processor to perform the claimed method steps of the various methods provided. In embodiments, the processors may be distributed, including a plurality of processing units communicatively coupled via a computer network.

The figures depict various example embodiments of the present disclosure for purposes of illustration only. One of ordinary skill in the art will readily recognize from the following discussion that other example embodiments based on alternative structures and methods may be implemented without departing from the principles of this disclosure and which are encompassed within the scope of this disclosure.

DETAILED DESCRIPTION

The above and other needs are met by the disclosed methods, a non-transitory computer-readable storage medium storing executable code, and systems for estimating camera motion through visual tracking using image and sensor data in low contrast and high-motion single camera systems but may be used in other applications with similar constraints.

The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures.

Figure 1:
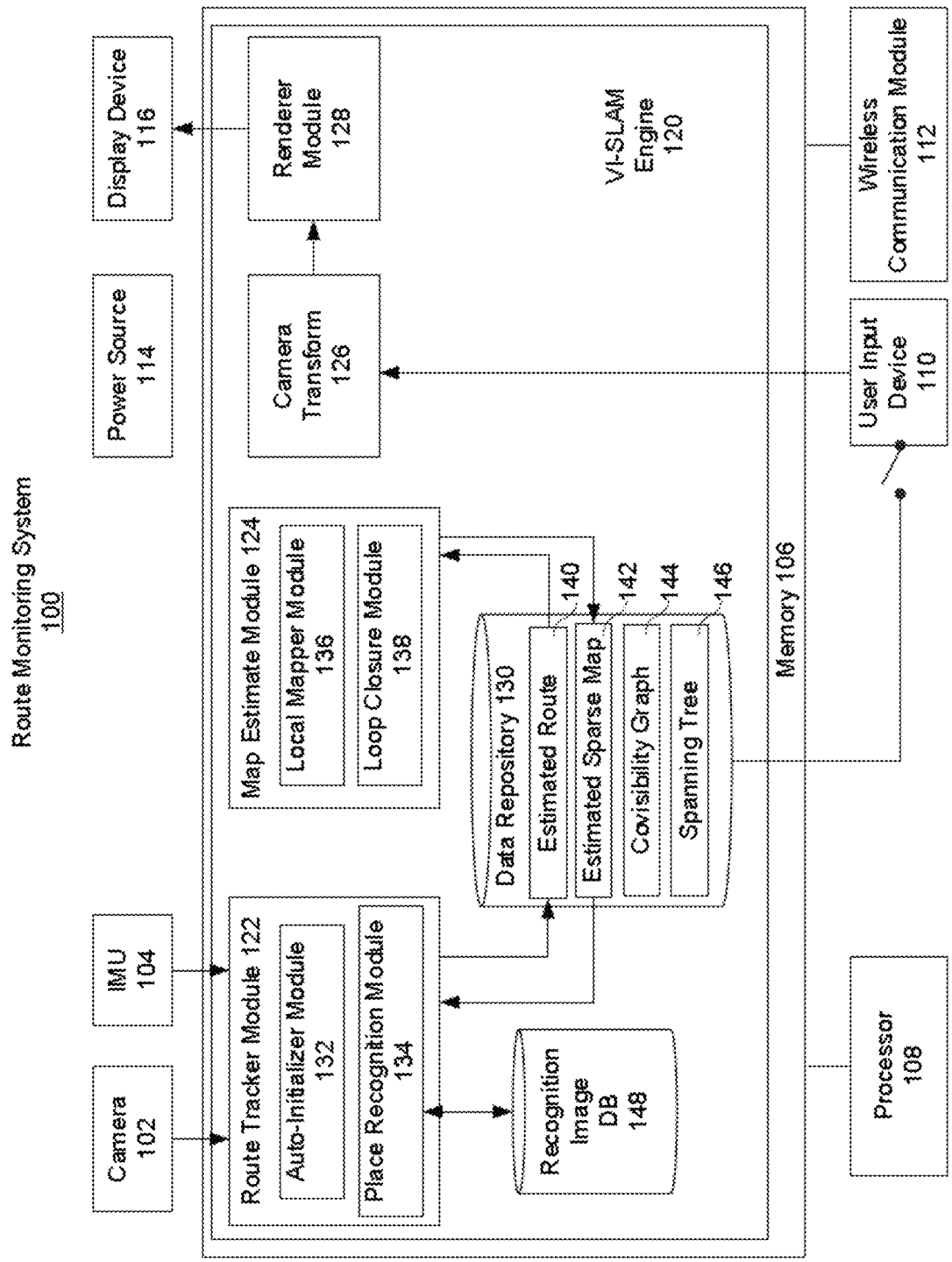
FIG. 1 is a block diagram illustrating an architecture for a route monitoring system according to disclosed embodiments.

According to the embodiments described herein, a system and method for estimating camera motion through visual tracking using image and sensor data in low contrast and high-motion single camera systems is provided. With reference now to FIG. 1, a route monitoring system implementing camera motion estimation according to embodiments of this disclosure is provided.

FIG. 1 is a block diagram illustrating an architecture for a route monitoring system according to disclosed embodiments. The route monitoring system 100 may be implemented as a portable or wearable device comprising a camera 102, an inertial measurement unit (IMU) 104, a memory 106, a processor 108, a user input device 110, wireless communication components 112, a power source 114 and a display device 116.

In one embodiment, the camera 102 may comprise a visible light camera, a thermal camera or combination thereof. Example types of thermal cameras include near-infrared, short-wavelength infrared, medium wavelength infrared, or long wavelength infrared. The IMU 104 comprises a 3-axis gyroscope, a 3-axis linear accelerometer, and a 3-axis magnetometer. The power source 114 may comprise one or more rechargeable and/or replaceable batteries. The processor 108 may comprise one or more processing units (CPUs), including multi-core CPUs, and/or graphical processing units (GPU's) and/or a digital signal processor (DSP), and/or field programmable gate arrays (FPGAs), and/or any other type of general parallel processors (GPP). In one embodiment, the display device 116 may be part of an augmented reality optic worn as glasses or as a monocle. In another embodiment the display device 116 may be part of a smartphone running an augmented reality system application. Communication module 112 may include components for transmitting and receiving data over a wireless network using a variety of wireless protocols including 802.11, WLAN, WPA, WEP, Wi-Fi and wireless broadband and/or cellular 3G/4G/5G.

According to embodiments, the route monitoring system 100 further comprises a monocular visual-inertial simultaneous localization and mapping (VI-SLAM) engine 120, which may be stored in memory 106 and executed by a processor 108. The VI-SLAM engine 120 may include a route tracker 122, a map estimate module 124, the camera transform module 126, an augmented reality (AR) renderer 128, and a data repository 130. The route tracker module 122 may include an auto-initializer module 132 and a place recognition module 134. The map estimate module 124 may include a local map or module 136 and a loop closure module 138.

At a high level, the route tracker module 122 receives a stream of image frames from the camera 102 and motion data from the IMU 104. The motion data comprises orientation data from the 3-axis gyroscope representing orientation data from camera, acceleration data from the 3-axis linear accelerometer representing the acceleration of the camera that generates, and ambient geomagnetic field from the 3-axis magnetometer. Each type of data is generated for all three physical axes (x, y, z). Thus the motion data from the IMU 104 is a 9-dimensional time series.

From the series of image frames and motion data, the route tracker module 122 estimates camera position or poses according to embodiments of this disclosure. For example, the most recent inter-frame camera motion transformation can be refined by taking the camera track of each pixel into consideration and optimizing the inter-frame motion to be most consistent with the current epipolar geometry. According to embodiments, a particle filter over candidate camera motions is used to evaluate refined inter-frame camera motions. The candidate camera motions are sampled from the parameter covariance matrix calculated during the initial camera motion estimate, for example, using a hierarchical homography estimation as further described below. Each candidate camera motion is scored against the Sampson error of the Essential Matrix associated with the complete camera track, which includes the candidate camera motion as its most recent update.

In some embodiments, using the camera pose estimates, the route tracker module 122 iteratively generates an estimated route 140 of the camera 102 (and hence the route of the route monitoring system 100 and a user of the system 100) over time. In some embodiments, the estimated route 140 is a sequence of camera poses over time represented as a graph and is stored in data repository 130. The estimated route 132 can be combined with any previous estimated maps 142. According to one aspect of some embodiments, the sparse estimated map 134 can be generated by the map estimate module 124, for example using keyframes determined from the image frames. Any new camera pose motion data is used to update the estimated map 142. That is, as the user and the system moves, the map estimation module 124 builds up a sparse map of the environment and embeds the trajectory of the IMU 104 into the sparse map.

In some embodiments, the local mapper module 136 can use keyframes and map points for mapping the user trajectory. In these embodiments, a keyframe comprises a camera pose in world coordinates, a transformation for mapping world coordinates into camera coordinates, a set of 2D image features matched to 3D points among other possible elements. However keyframes with different elements may used in other embodiments or keyframes may not be used at all. In this instance, two or more image frames may be used to define a keyframe usable to establish 3D point correspondences. Map points are 3D points in the estimated map augmented by camera viewing constraints. Local map optimization brings in neighboring map point and keyframe constraints to jointly optimize over a local region of keyframes and map points, and thereby improves the accuracy of all members. Global corrections are made via sparse essential graph optimization and loop closing can be performed by the loop closure module 138. Lastly, in the event of tracking loss or intermittent unstable camera imagery, place recognition and relocalization are performed by the place recognition module 134 to reorient the system.

According to one aspect of some embodiments, motion data from the IMU 104 can be used to improve inter-frame motion estimation. In addition, in some embodiments an oriented pedometer is also used to improve the camera pose estimates, which is operable in the absence of image data. Updates to the estimated route 140 and the estimated map 142 can continue iteratively. The map estimate module 124 also creates and stores a covisibility graph 144 and a spanning tree 146 during generation of the estimated map.

According to another aspect of some embodiments, once the user is on a return trip and wishes to view the route the user can travel back to the origin, the user may activate a user input device 110, such as, for example, a button, visually captured sign or motion, voice, touch, or other input. This causes data associated with the estimated route 140 to be sent to the camera transform 126, which projectively transforms the data from the estimated sparse map 142 in the camera orientation to the egocentric perspective of the user as seen through the display device 116, resulting in a mapping from the camera perspective of the route to what the user sees in the display device 116. The renderer module 128 then displays transformed data on the display device 116. In some embodiments, the display device 160 may comprise an augmented reality (AR) display worn over a user' eye or eyes that superimposes a visualization of the route in the user's field of view. These visualizations and navigation cues are representative of the route the user took earlier from the origin to their current position. The user may then follow this displayed route or breadcrumbs back to the origin where they initiated the current trip. For example, a firefighter (or other human first responder, military personnel, or the like) can use the system's route indications to return to the entrance of a building, being assisted through unknown rooms and hallways, possibly in low visibility, e.g., low light and/or smoke, conditions.

In embodiments, the estimated route 140 and the estimated map 142 may be both stored on the portable device. In embodiments, the routes may be transmitted to the cloud over wireless networks (e.g., using 4G/5G, Wi-Fi, or other technologies) by the wireless communication module 112 for storage, retrieval and distribution. As such the system 100 allows users to navigate back to the start, log routes, and share the routes with others.

In one embodiment, the route monitoring system 100 is implemented as a wearable public safety device worn by a first responder, such as a firefighter, police officer, paramedic, or the like. In this embodiment, the route monitoring system 100 comprises a housing designed to attached to, or integrate with, a helmet (and mask if any) worn by a user/crewmember. The housing integrates a processor executing a VI-SLAM engine and includes a thermal imaging camera (TIC) and an augmented reality (AR) display. Similar embodiments may include different and/or additional components without departing from the teachings of this invention. Similarly, other embodiments of high-motion, single camera systems may be used within the spirit of the invention in different applications.

In one embodiment, a route tracker module such as that illustrated in FIG. 1 implements a method for estimating camera motion in high-motion, single camera systems. In one embodiment, a Motion Aware Dense Matching Correspondences Algorithm provides the method for camera motion estimation. This method is based on a dense, multi-level, iterative optimization algorithm that estimates a homography between images, allowing for the extraction of camera motion and the creation of a correspondence map. These can then be used to estimate parallax and update a 3D map, for example.

Figure 2:
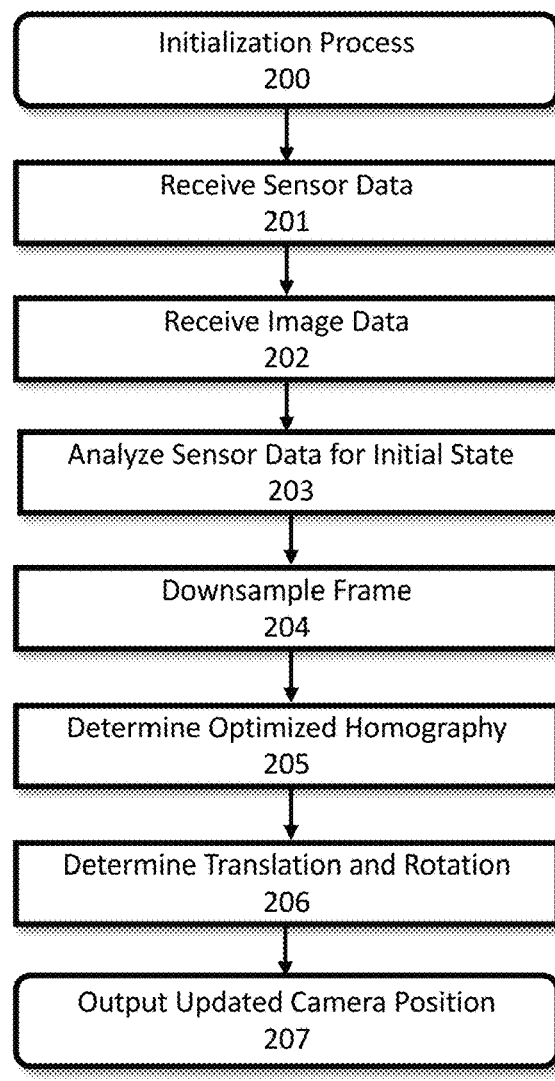
FIG. 2 is a block diagram of a method for estimating camera motion in high-motion, single camera systems according to embodiments.

Now referring to FIG. 2, a block diagram of a method for estimating camera motion in high-motion, single camera systems is provided according to embodiments. At startup 200 the system is initialized. In one embodiment, an initialization approach similar to that described in Strasdat, H., Montiel, J. and Davison, A. J., 2010. Scale drift-aware large scale monocular SLAM. *Robotics: Science and Systems VI*, 2(3), p. 7. (incorporated herein by reference) may be used. However, to optimize this initialization process for thermal images, a dense tracking approach based on full-pixel initialization is used instead of a feature-based approach. In one embodiment, a dense initialization method for thermal image keyframe-based SLAM systems based on a set of three dimensional information filters which can estimate the position of each pixel in the frame. Each filter estimates the position of a single pixel given the current pose estimate, for example based on camera and sensor settings. In this approach, inverse depth coordinates are used to represent each pixel in the frame with respect to the origin. Instead of using a normalized cross-correlation approach, in some embodiments a bisection algorithm may be used on a GPP, which may provide a faster convergence.

Notably, this initialization approach allows for fast initialization without requiring any complex initialization process that may be unsuitable for first-responder applications. According to one embodiment, the initial estimate of interframe camera motion is estimated as a homography between 2 images. The initial conditions are provided by the IMU and the homography is parameterized in a Special Euclidean group parameterization, SE(3)(ω, ν) according to:

$$T = \begin{bmatrix} R & t \\ 0 & 1 \end{bmatrix}$$ [Equation 1]

where R is defined as $R(\omega) \in SO(3)$ and $t(\nu) \in \mathbb{R}^3$. Then the homography H is given by:

$$H = R + \frac{tn^T}{d}$$ [Equation 2]

where the distance d may be computed in real time, estimated, or assumed to be an initial value, for example 1 meter. Similarly, the normal vector n may be estimated or assumed to be an initial value, such as for example n={0, 0,1} along the positive z-axis of the camera.

Sensor data is received 201, for example from an IMU. Similarly, image data is received 202, for example a frame from a thermal imaging system. According to one aspect of some embodiments, the sensor data and image data are synchronized during a factory calibration process. That is, the timing for an image frame and a motion sensor data set are substantially the same. Different approaches may be used for the synchronization of the sensor and image data in different embodiments. Further, in some embodiments, periodic calibrations may be provided to avoid any drift. The sensor data is first analyzed to determine an initial state 203 for the camera motion estimate. For example, in some embodiments, an initial camera position, initial estimated homography, resulting image warp, and difference score are estimated from the motion sensor data for the current frame compared to the prior frame. In this step, if for example the current frame has no variation from the prior frame, the resulting different score may be zero. In some embodiments, the process may be ended at this step for frames with a zero difference score and the system moves on to the next frame until a non-zero difference score is determined. It should be noted that "non-zero" may refer to any score above a minimum threshold.

Figure 3:
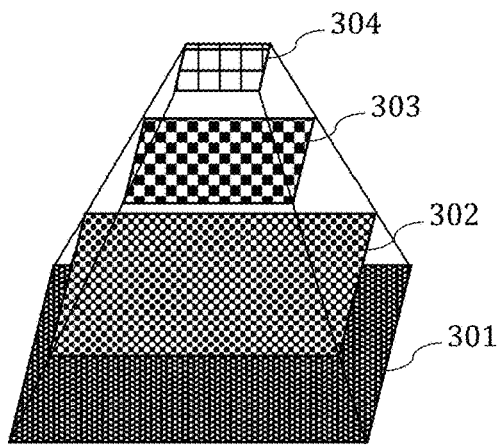
FIG. 3 is a diagram illustrating an image pyramid according to embodiments.

The current image frame is down-sampled to generate a lower resolution version of the frame. This process is repeated several time to generate a set of frames of progressively lower resolution, e.g., a logical image pyramid of frames at different resolutions as for example illustrated in FIG. 3. FIG. 3 shows an illustration of an image pyramid according to embodiments. Original frame 301 is the full-resolution frame (or a copy thereof). Frame 302 is the same frame but with a lower level of resolution as compared to frame 301. Frame 303 is another version of the frame but with lower resolution than frame 302. And frame 304 is another version of the same frame but with the lowest amount of resolution. While in this example 4 frames are shown for illustration, any number of frames may be used. Any known approach for reducing frame resolution may be used. For example, pixel smoothing or down-sampling is used in one embodiment.

Referring back to FIG. 2, the down-sampling process 204 is applied to each frame to be analyzed. The current frame is compared to a prior frame using the down-sampled image pyramid to determine an optimized homography 205 between the two frames. For example, in one embodiment the comparison process is based on a cost function computed at each pixel in a current frame x' and a prior frame x. The cost of each pixel in prior frame $I^P(x)$ under a homography H in a target image $I^C(x')$ is given by the following equation:

$$\text{cost}(x) = I^P(x) - I^C(Hx')$$ [Equation 3]

or put another way:

$$\text{cost}(I^P, I^C) = \Sigma_{x \in I^P} \|\text{cost}(x)\|^2$$ [Equation 4]

According to embodiments, at each level of the down-sampled image pyramid hierarchy, starting at the lowest resolution image at the top, the Levenberg-Marquardt Optimization method is used to define a set of regularized linear equations, Ax=b, to find the change in parameters ∂p={∂w, ∂v}, defining the homography that minimizes the cost function. For example, the cost function can be linearized in terms of the parameters of interest as follows:

$$\text{cost}(x, p+\partial p) \approx \text{cost}(x,p) + J\partial p$$ [Equation 5]

where J is defined as follows:

$$J = \begin{bmatrix} \frac{\partial \text{cost}(x_0)}{\partial p_0} & \frac{\partial \text{cost}(x_0)}{\partial p_1} & \cdots & \frac{\partial \text{cost}(x_0)}{\partial p_m} \\ \frac{\partial \text{cost}(x_1)}{\partial p_0} & \frac{\partial \text{cost}(x_1)}{\partial p_1} & \cdots & \frac{\partial \text{cost}(x_1)}{\partial p_m} \\ & \cdots & & \\ \frac{\partial \text{cost}(x_n)}{\partial p_0} & \frac{\partial \text{cost}(x_n)}{\partial p_1} & \cdots & \frac{\partial \text{cost}(x_n)}{\partial p_m} \end{bmatrix}$$ [Equation 6]

Then, the linear system, A∂p=b, for solving for ∂p is provided as follows:

$$A = [J^t J - \lambda \text{diag}(J^T J)]$$ [Equation 7]

$$b = J^t F$$ [Equation 8]

$$F = \begin{bmatrix} \text{cost}(x_0) \\ \text{cost}(x_1) \\ \dots \\ \text{cost}(x_n) \end{bmatrix} \quad \text{[Equation 9]}$$

From the optimized homography, translation and rotation parameters for the estimated camera motion are determined 206. These parameters are used to output an updated camera position 207.

Figure 4:
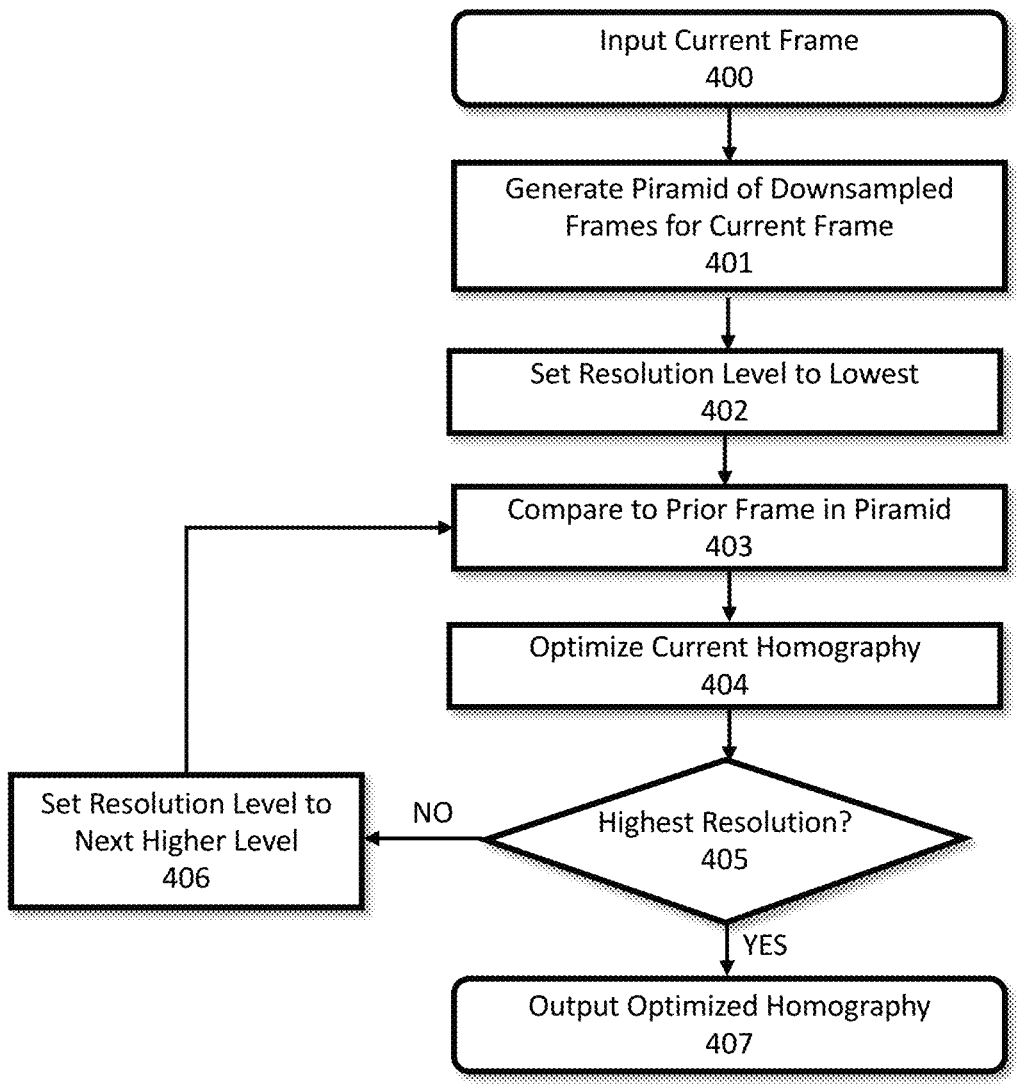
FIG. 4 is a block diagram illustrating a hierarchical homography fitting according to embodiments.

According to one aspect of some embodiments, a hierarchical homography fitting approach is used to determine the optimized homography 205. FIG. 4 is a block diagram illustrating a hierarchical homography fitting according to embodiments. The processing involves a frame-by-frame analysis to determine motion parameters for the pixels between the two frames. As is known in the art, a homography can be used to capture camera motion, rotation and translation, between two images. Thus, given two frames of the same scene sequentially taken by the thermal imaging camera, knowing the current camera rotation and translation parameters in the current frame [R,t], a homography H between the pixels in the two frames can be used to determine the camera rotation and translation parameters in the second frame [R',t'].

According to another aspect of embodiments of the invention, a homography can be used for visual tracking in single-camera systems. For example, an approach to use a homography for visual tracking using a single-viewpoint sensor is described in Mei, C., Benhimane, S., Malis, E. and Rives, P., 2008. Efficient homography-based tracking and 3-D reconstruction for single-viewpoint sensors. *IEEE Transactions on Robotics*, 24(6), pp. 1352-1364, which is incorporated herein by reference. As described by Mei, points can be mapped to a perspective projection model using a spherical perspective projection and representing the resulting homography in a Special Linear group representation, i.e., $H \in SL(3)$ (the special linear group of dimension 3).

$$HR + tn_d^T$$

Here $R \in SO(3)$ is the rotation of the camera and $t \in R^3$ is its translation. The parameter $n_d^T = n/d$ is the ratio between the normal vector to the plane n, a unit vector, and the distance d of the plane to the origin of the reference frame.

Using that projection approach, however, leads to computationally intensive processing to determine the homography for each pixel. In SL(3) there are 8 candidate motions for each homography which can lead to a highly complex, and inaccurate, computation not suitable for real-time, life-critical applications. For example, representing each object with a set of volumetric parameters can over parametrize planar elements, i.e., a circle does not need as many parameters as a sphere. Accordingly, to accelerate processing for real-time tracking in a head-mounted system, with large motion, in embodiments a simplified parameterization is used. Instead of SL(3) parametrization, in some embodiments a Special Euclidean group parameterization, SE(3), is used to represent the motions associated with homography estimates. In first-responder applications, with a head-mounted system, application-specific constraints can be added to simplify and speed-up the processing. For example, in some embodiments, the image frame is always assumed to be perpendicular to the camera center. Similarly, given the typical scene in a first-responder application, frames can be assumed to represent a scene at a fixed distance from the camera center. For example, a set distance of between 0.5 to 10 meters can be assumed in these applications. In one embodiment, a 90 degree normal plane n and a 1 meter distance d are used for homography computations. In other embodiments different values may be used according to the typical scene encountered in the relevant application. Moreover, these values may be programmatically adapted based on real values measured by the system during use. For example, machine learning algorithms may be employed to learn the actual value over time and adapt the assumptions in a particular system based on usage.

According to another aspect of embodiments of the invention, the high-motion resulting from the placement of the first-responder tracking systems, typically on a helmet, prevents the incremental tracking homography-based approach of Mei from robustly tracking motion. The Mei approach looks for an optimal transformation as an optimization problem over the differences in intensities. This approach may work well in applications with small inter-frame displacements. However, when there are large and abrupt camera motions due to quick head movement, unlike for example a car-mounted system, the homography tracking algorithm can be limited by local minima of intensities within the entire frame, missing a higher level camera motion represented by the entire frame. To address this problem, in embodiments a hierarchical homography tracking approach is used.

According to some embodiments, a hierarchical homography fitting approach is used to process high-motion frame sequences. FIG. 4 is a block diagram illustrating a hierarchical homography fitting approach according to embodiments of this disclosure. The homography fitting is done on a frame-by-frame basis to compare a current frame with a prior frame in order to determine the camera motion represented in the differences between the two frames. A current frame is input 400 and an image pyramid of down-sampled frames for the current frame is generated 401. For example, a smoothing and down-sampling approach may be used to generate an image pyramid as illustrated in FIG. 3. It should be noted that the number of down-sampled frames in the image pyramid is customizable for the given application. Depending on the typical amount of motion, more or less frames can be used in different applications. Moreover, the number of frames in the pyramid may be programmatically adjusted to specific frames based on IMU motion detection. In some embodiments, when IMU readings exceed a threshold, a higher number of frames is generated in the image pyramid. Further, in embodiments, multiple thresholds may be used to vary the number of frames in the pyramid in real time during operation.

The frame resolution level for processing the current frame is set 402 to the lowest level available in the image pyramid. Then, the current frame is compared 403 to the corresponding frame in the image pyramid of the prior frame, i.e., the frame at the same resolution level. The comparison is done using the homography fitting approach but with the frames at low resolution. This reduces the amount of local minima in intensities across the frame, speeding up the homography optimization step 404 across the entire frame at this lower resolution level. It should be noted that in some embodiments, where the current frame image pyramid has a different number of resolution levels than the prior frame, a new image pyramid for the prior frame can be generated before this comparing step 403 so that image pyramids for both current and prior frames have the same number of resolution levels. The resolution level is checked 405 to determine if the highest resolution level has been reached. If not, the resolution level is increased 406 to the next higher resolution level available in the image pyramid and the comparison 403 and homography optimization 404 steps are repeated with the current and prior frames at the next resolution level. Once the highest resolution level is reached, the hierarchical homography optimization process is completed and the optimized homography estimate for the current frame is output 407. Details on one approach for hierarchical processing that may be used in some embodiments can be found in Lovegrove, S. and Davison, A. J., 2010, September. Real-time spherical mosaicing using whole image alignment. In *European Conference on Computer Vision* (pp. 73-86). Springer, Berlin, Heidelberg, which is incorporated herein by reference. In embodiments, the resulting optimized homography is used to determine the best estimate of camera motion, not only rotation, but also translation from the previous to the current frame.

By way of example, a practical application of a first-responder system implementing an embodiment according to this disclosure provides a beneficial life-saving result based on the improved performance for tracking in low illumination conditions. For example, at the scene of an emergency or disaster, all too often first responders end up as victims within the hazardous circumstances they operate. A major task of first responders is to conduct search and rescue operations for not only civilian victims but also for their colleagues who may find themselves in distress. The existing technologies widely used to aid first responders in searching for and rescuing their downed colleagues—high-pitched alarms and flashing lights—can be improved upon according to embodiments of this invention.

The accurate inter-frame camera motion estimates output by systems according to embodiments of this invention provide an essential input to a tracking and mapping system. When these data are fused with wireless signal transceivers—such as 802.11 WIFI, Bluetooth, ultra-wideband, etc.—e.g., sensors in a Wireless Communications Module 112, a powerful Mayday search and rescue assistant emerges. Wireless signal strength is a highly non-linear function of the obstacles and materials between the transmitter and the receiver. Camera motion estimates provided an accurate estimate of the trajectory of the user, but no information regarding the position of their downed colleague.

For example, according to one embodiment, a Mayday signal transmission radiates wireless power that is detectable by head-mounted systems of search and rescue team members. The head-mounted systems of the search and rescue team receives the wireless power via Communications Module sensors and provides the sensed signal to the processor for incorporating ranging data based on the wireless power of the Mayday signal with camera motion estimates from the single-camera infrared system. The highly noisy wireless power signals are referenced against the time-series of camera motion estimates to zero in on the location of the source of the signal. The output of this process can be displayed, for example, via a display device with indications pointing to the location of the source of the Mayday signal. The resulting system provides a Mayday search and rescue assistant to help first responders find their colleagues in distress when seconds matter the most.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

BIBLIOGRAPHY

The following references are incorporated herein by reference in their entirety:

Engel, Jakob, Thomas Schöps, and Daniel Cremers. "LSD-SLAM: Large-Scale Direct Monocular SLAM." In *Computer Vision— ECCV* 2014, edited by David Fleet, Tomas Pajdla, Bernt Schiele, and Tinne Tuytelaars, 834-49. Lecture Notes in Computer Science. Cham: Springer International Publishing, 2014. https://doi.org/10.1007/978-3-319-10605-2_54.

Engel, Jakob, Jürgen Sturm, and Daniel Cremers. "Semi-Dense Visual Odometry for a Monocular Camera." In *2013 IEEE International Conference on Computer Vision*, 1449-56, 2013. https://doi.org/10.1109/1CCV.2013.183.

Faugeras, Olivier, and F. Lustman. "Motion and Structure from Motion in a Piecewise Planar Environment." *International Journal of Pattern Recognition and Artificial Intelligence—IJPRAI* 02 (Sep. 1, 1988). https://doi.org/10.1142/S0218001488000285.

Kerl, Christian, Jürgen Sturm, and Daniel Cremers. "Dense Visual SLAM for RGB-D Cameras." In *2013 IEEE/RSJ International Conference on Intelligent Robots and Systems*, 2100-2106, 2013. https://doi.org/10:1109/IROS.2013.6696650.

Lovegrove, Steven, and Andrew J. Davison. "Real-Time Spherical Mosaicing Using Whole Image Alignment." In Computer Vision—ECCV 2010, edited by Kostas Daniilidis, Petros Maragos, and Nikos Paragios, 73-86. Lecture Notes in Computer Science. Berlin, Heidelberg: Springer, 2010.

Mei, Christopher, Selim Benhimane, Ezio Malis, and Patrick Rives. "Efficient Homography-Based Tracking and 3-D Reconstruction for Single-Viewpoint Sensors." *IEEE Transactions on Robotics* 24, no. 6 (December 2008): 1352-64. https://doi.org/10.1109/TRO.2008.2007941.

Newcombe, Richard A., Steven J. Lovegrove, and Andrew J. Davison. "DTAM: Dense Tracking and Mapping in Real-Time." In 2011 *International Conference on Computer Vision*, 2320-27, 2011. https://doi.orq/10.1109/ICCV.2011.6126513.

Strasdat, Hauke, J. M. M. Montiel, and Andrew J. Davison. "Scale Drift-Aware Large Scale Monocular Slam." In *In Proceedings of Robotics: Science and Systems*, 2010.

The invention claimed is:

1. A computer-implemented method for estimating camera motion through visual tracking using image and sensor data, the method comprising:
   receiving motion sensor data from a wearable motion sensor worn by a human;
   receiving image data from a thermal imaging camera, the image data comprising a first low contrast video frame representing a translation and a rotation of the camera through an environment;
   analyzing the motion sensor data to determine an initial camera position and an initial homography for the first frame;
   down-sampling the first frame to generate a subset of frames of progressively lower resolution, the subset of frames including a lowest resolution frame;
   determining an optimized homography by optimizing the initial homography based on a difference between the current frame and a prior frame from the thermal imaging camera using the subset of frames of progressively lower resolution beginning with the lowest resolution frame;
   determining a modified translation and rotation displacement of the camera based on the optimized homography;
   building a sparse map of the environment using the modified translation and rotation displacement of the camera; and
   transforming the sparse map from a camera orientation to an egocentric perspective of the human.

2. The computer-implemented method of claim 1, further comprising:
   receiving remote signal data from a wireless power sensor, the remote signal data associated with a remote wireless signal; and
   combining the modified translation and rotation displacement of the camera with the remote signal data to determine a source location of the remote wireless signal.

3. The computer-implemented method of claim 1, wherein the modified translation and rotation displacement of the camera is used to track a route through the environment.

4. The computer-implemented method of claim 3, further comprising transmitting the route over a wireless network.

5. The computer-implemented method of claim 3, further comprising displaying the route to the human.

6. The computer-implemented method of claim 5, wherein displaying the route comprises providing navigation cues to the human on a display in the egocentric perspective of the human.

7. The computer-implemented method of claim 1, further comprising computing an estimated camera motion from the modified translation and rotation displacement of the camera.

8. The computer-implemented method of claim 7, further comprising creating a correspondence map of at least a portion of the environment using the estimated camera motion.

9. The computer-implemented method of claim 1, wherein the human is a first responder.

10. The system of claim 9, wherein the instructions executed by the processing unit further cause the processing unit to:
    receive remote signal data from a wireless power sensor, the remote signal data associated with a remote wireless signal; and
    combine the modified translation and rotation displacement of the camera with the remote signal data to determine a source location of the remote wireless signal.

11. The system of claim 9, wherein the modified translation and rotation displacement of the camera is used to track a route through the environment.

12. The system of claim 11, further comprising a wireless transmitter for transmitting the route over a wireless network.

13. The system of claim 11, further comprising a display configured to display the route to the human.

14. The system of claim 13, wherein the display is further configured to provide navigation cues to the human.

15. The system of claim 9, wherein the instructions executed by the processing unit further cause the processing unit to compute an estimated camera motion from the modified translation and rotation displacement of the camera.

16. The system of claim 15, wherein the instructions executed by the processing unit further cause the processing unit to create a correspondence map of at least a portion of the environment using the estimated camera motion.

17. The system of claim 9, wherein the human is a first responder.

18. The system of claim 9, further comprising a helmet, wherein the sensor module, the camera module, the memory, and the processor are incorporated into the helmet.

19. The system of claim 18, wherein the helmet further comprises the wearable motion sensor and the thermal imaging camera.

20. The computer-implemented method of claim 1, wherein the down-sampling includes regularization using the Levenberg-Marquardt Optimization method.

21. A system for estimating camera motion through visual tracking using image and sensor data, the system comprising:
    a sensor module for receiving motion sensor data from a wearable motion sensor worn by a human;
    a camera module for receiving image data from a thermal imaging camera, the image data comprising a first low contrast video frame representing a translation and a rotation of the camera through an environment;
    a memory storing instructions and data; and
    a processing unit, the processing unit communicatively coupled to the memory for executing instructions that cause the processing unit to:

analyze the motion sensor data to determine an initial camera position and an initial homography for the first frame;

down-sample the first frame to generate a subset of frames of progressively lower resolution, the subset of frames including a lowest resolution frame, wherein the down-sampling includes regularization using the Levenberg-Marquardt Optimization method;

determine an optimized homography by optimizing the initial homography based on a difference between the current frame and a prior frame from the thermal imaging camera using the subset of frames of progressively lower resolution beginning with the lowest resolution frame;

determine a modified translation and rotation displacement of the camera based on the optimized homography;

build a sparse map of the environment using the modified translation and rotation displacement of the camera; and transform the sparse map from a camera orientation to an egocentric perspective of the human.

22. The system of claim 21, wherein the down-sampling includes regularization using the Levenberg-Marquardt Optimization method.

* * * * *